United States Patent [19]

Lee et al.

[11] Patent Number: 4,517,567
[45] Date of Patent: May 14, 1985

[54] RADAR TRIGGER AND PRETRIGGER GENERATOR HAVING DELAY SENSING AND COMPENSATING CIRCUIT

[75] Inventors: Patrick G. Lee; Donald E. Bean, both of Ruckersville; Randy T. Jones, Charlottesville, all of Va.

[73] Assignee: Sperry Corporation, N.Y., N.Y.

[21] Appl. No.: 352,484

[22] Filed: Feb. 25, 1982

[51] Int. Cl.$^3$ ............................................. H03K 5/15
[52] U.S. Cl. ................................. 343/17.7; 328/55; 375/118
[58] Field of Search ...................... 332/5; 331/5, 87; 375/71, 23; 343/17.1 R, 17.7, 5 SW, 5 ST, 5 SM; 307/234, 269; 328/63

[56] References Cited

U.S. PATENT DOCUMENTS

| | | | |
|---|---|---|---|
| 2,946,021 | 7/1960 | Siedband et al. | 331/87 |
| 2,955,263 | 10/1960 | Hobrough | 331/87 |
| 3,950,704 | 4/1976 | Humpherys | 343/6.5 LC |
| 4,083,007 | 4/1978 | Levine | 375/23 |
| 4,250,454 | 2/1981 | Sakamoto | 343/17.1 R |

Primary Examiner—Robert L. Griffin
Assistant Examiner—Raymond C. Glenny
Attorney, Agent, or Firm—Howard P. Terry

[57] ABSTRACT

The radar trigger and pretrigger generator determines the inherent component time delay through the radar modulator and transmitter during a first cycle of operation. During the next cycle of operation a pretrigger pulse is generated after a time corresponding to the previously measured delay and a trigger pulse is generated after a time corresponding to an operator selectable delay. The trigger pulse is used to trigger the radar modulator, which in effect, permits the operator to control the elapsed time between pretrigger pulse and transmitter firing in a fashion which is completely independent of circuit delay variances through the radar modulator and transmitter.

12 Claims, 2 Drawing Figures

RADAR TRIGGER AND PRETRIGGER GENERATOR HAVING DELAY SENSING AND COMPENSATING CIRCUIT

BACKGROUND OF THE INVENTION

1. Field of the Invention

This invention relates generally to trigger generators, and in particular to a trigger generator for use with radar equipment which senses and compensates for inherent time delays through the radar equipment, and provides a trigger pulse and variable delay pretrigger pulse for firing the radar transmitter and driving peripheral equipment.

2. Description of the Prior Art

In conventional radar equipment a periodically recurring trigger pulse is applied to the radar modulator causing the transmitter to fire a burst of radio frequency energy through the radar antenna. The conventional modulator may incorporate pulse forming network coupling coils, and damping networks, all of which contribute to an inherent time delay between triggering the modulator and firing the output RF burst. Adding to this time delay, the transmitter, which may comprise a magnetron or other transmitting tube, requires a finite time in which to draw current after the normal voltage is applied to it. Such inherent time delays are not constant, but vary with environmental conditions such as temperature and humidity and operational condition.

In some conventional radar equipment, a pretrigger is used to indicate that the radar transmitter is about to fire. For instance, although not normally required in commerical marine radars, a marine vessel traffic system (VTS) may require a pretrigger to drive peripheral equipment. A vessel traffic system might be constructed in which the transmitter and antenna are at a remote location with respect to the master station. With such an arrangement the radar trigger pulse might be generated at the remote location with certain timing and operator control signals being transmitted via a microwave or hard wire communication link from the master station. A pretrigger pulse might also be generated to enable or turn on peripheral equipment in advance of the transmitter being fired. The peripheral equipment might be located at the master station or at some other remote location. Frequently, it is desirable that the timing of this pretrigger should be adjustable with respect to the firing of the radar transmitter. However, due to the inherent time delays through the radar modulator and transmitter, it has not heretofore been possible to accurately adjust the timing of the pretrigger without a prior knowledge of the factors and characteristics of the radar in its environment which contribute to this time delay. It will be appreciated that these conditions, such as temperature and humidity, may differ between the master station and the remote site.

The prior art technique for providing a pretrigger has been to place a monostable multivibrator between the radar trigger generator and the radar modulator. A monostable multivibrator receives the radar trigger pulse and generates a delayed pulse using a resistor capacitor (RC) network to achieve the desired time delay. The radar trigger is then treated as a pretrigger and the output of the monostable multivibrator is applied to the radar transmitter as a trigger pulse. The time delay between the pretrigger and trigger pulse is adjustable by means of the RC time constant. It will be seen that this method does not account for the inherent time delay through the radar modulator and transmitter. Thus the pretrigger timing must be based upon an assumed nominal time delay through the radar modulator and transmitter. Another shortcoming of this technique is that the timing period of the monostable multivibrator changes as a function of supply voltage, temperature, and component aging. Thus often sophisticated power supply regulating techniques, close thermal tolerances, and frequent routine maintenance are required to assure system performance.

SUMMARY OF THE INVENTION

A first reference pulse derived from the output of a trigger generator, such as a conventional radar trigger generator, is used to trigger the object circuit, which may be a radar modulator and transmitter, causing the circuit to fire or produce its response after a time delay inherent to the circuit. The invention finds particular utility in the radar art; however, it will be recognized that the invention may be used to trigger any of a number of circuits which, when triggered, produce a response after a time delay. The time delay is measured using a modulator delay counter which is enabled upon triggering of the transmitter or other object circuit to count in synchronism with a system clock until being disabled upon firing. A second reference pulse is generated during a second operation cycle and a pretrigger pulse is generated after a first period following the second reference pulse, the first period corresponding to the measured time delay. The transmitter or object circuit is again triggered, after a second period following the second pulse, the second period being selectable by the operator.

The invention provides a pretrigger pulse at a preselected time before the firing of the radar transmitter, or before the object circuit produces its response after being triggered, the preselected time being independent of any inherent circuit time delays through the radar modulator or object circuit. The invention also permits the operator to manually vary the time at which the radar transmitter or other object circuit is triggered, and therefore permits the operator to select the time interval between the pretrigger and the trigger.

DESCRIPTION OF THE PREFERRED EMBODIMENT

Figure 1:
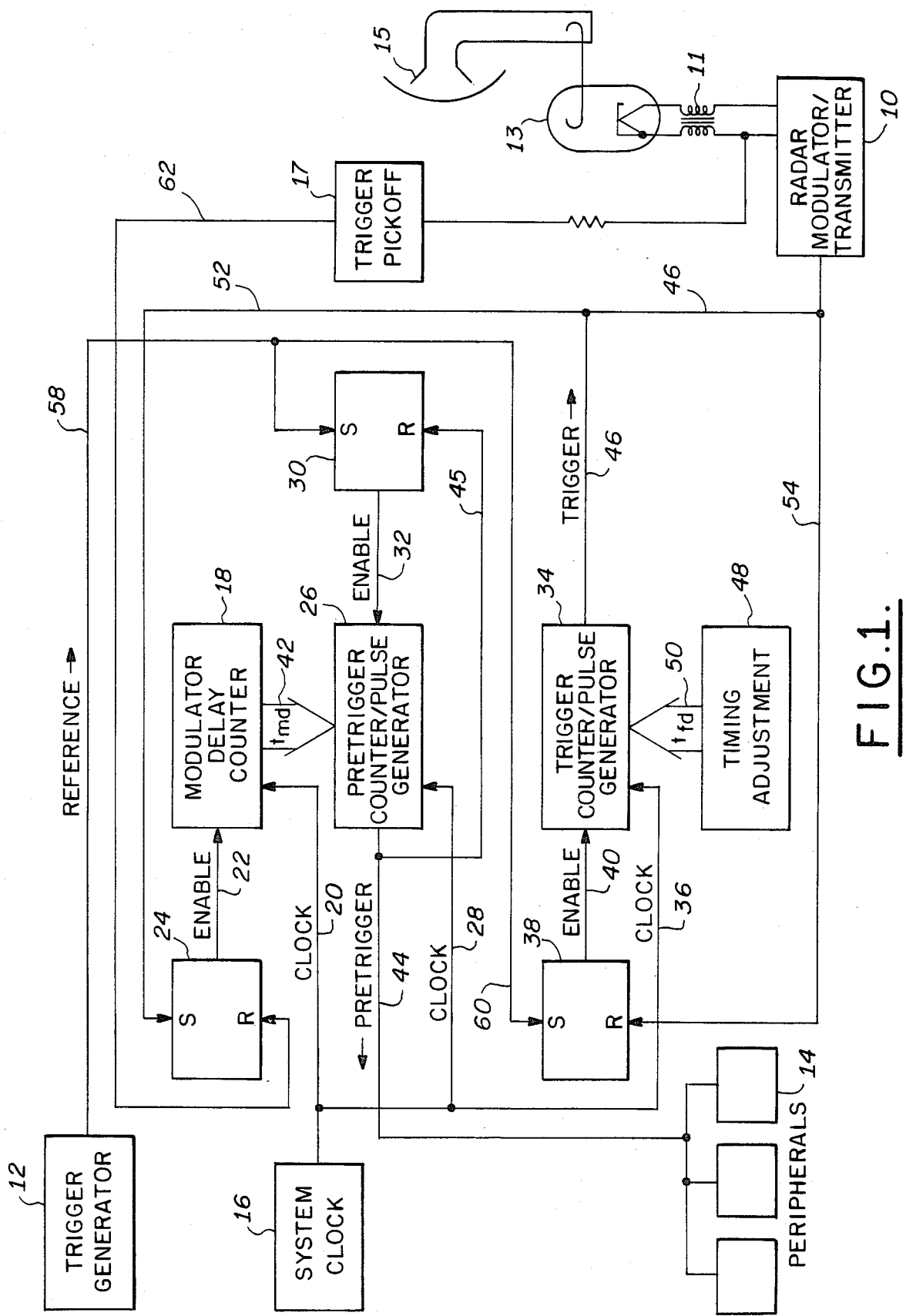
FIG. 1 is a block diagram illustrating the principles of the invention.

FIG. 1 illustrates the preferred embodiment of the invention as it might be practiced in the radar art. A conventional radar modulator and transmitter 10 is shown in block diagram form in FIG. 1 coupled through a pulse transformer 11 to a magnetron transmitting tube 13. The magnetron transmitting tube feeds a radar antenna 15 in the usual fashion. FIG. 1 also shows a conventional trigger generator 12 and a number of peripheral devices 14 of the type which require a pretrigger, such as electronic counter measure (ECM) devices, or signal processing circuits, for example. The trigger generator 12 is such as might be connected directly to the radar modulator and transmitter 10 in conventional radar circuits for providing a trigger pulse to fire the radar. As is well known, radar modulators conventionally have an inherent component delay so that the burst of radio frequency energy delivered to the antenna is not emitted until some finite time after the trigger pulse is applied to the modulator. This time delay is dependent upon a number of factors including temperature, humidity, and component aging, as well as upon the modulator and transmitter circuit design. Thus the time delay may vary widely from environment to environment and from radar to radar. The conventional radar also includes trigger pickoff circuitry 17 which is usually coupled to sense the modulator signal applied to the magnetron transmitting tube. The pickoff circuitry provides a signal substantially coincident with the burst of RF energy radiated through the antenna 15 and is therefore indicative that the radar transmitter has fired.

The foregoing may be considered as representative of conventional radar systems, there being a number of functionally equivalent system designs. While the present invention finds immediate utility in the radar art, it will be appreciated that the circuit of the invention is equally useful for triggering device having an inherent time delay and also for providing a pretrigger to that device or to peripheral devices.

The present invention is inserted between the trigger generator 12 and the radar modulator and transmitter 10, and is also connected to the peripheral devices 14 as shown in FIG. 1. The invention comprises a system clock 16 for providing a succession of clock pulses which serve as a time base for sequencing and counting operations. A first counter, referred to hereinafter as modulator delay counter 18, is coupled to the system clock via lead 20 and is also coupled via lead 22 to the output of a first flip flop, hereinafter referred to as modulator delay flip flop 24. A second counter, hereinafter referred to as pretrigger counter 26 receives the clock on lead 28 and is also coupled to the output of a second flip flop, designated as pretrigger flip flop 30 via lead 32. A third counter, designated as trigger counter 34 receives the clock on lead 36 and is coupled to a third flip flop or trigger flip flop 38 via lead 40.

Each of the three counters, namely the modulator delay counter 18, the pretrigger counter 26, and the trigger counter 34, are preferably binary counters which count clock pulses when enabled by their respective flip flops 24, 30 and 38. They may be configured to count in straight binary, in binary coded decimal (BCD), or in some other numbering system. The output of modulator delay counter 18, which may consist of a plurality of digits representing a time delay value, is carried via a parallel data bus 42 to the input of pretrigger counter 26. The output of pretrigger counter 26, which may be a single pretrigger pulse, for instance, is carried on lead 44 and coupled to the peripheral devices 14. The output of pretrigger counter 26 is also coupled via lead 45 to the reset or R terminal of the pretrigger flip flop 30. The output of trigger counter 34, which may be a modulator trigger pulse, for example, is carried via lead 46 to the input of radar modulator and transmitter 10. The output of trigger counter 34 is also coupled via lead 52 to the set or S terminal of modulator delay flip flop 24, and is also coupled via lead 54 to the reset or R terminal of trigger flip flop 38.

The trigger counter 34 is also supplied with a timing adjustment signal derived from a timing adjustment control 48 which provides a plurality of digits representing a desired time delay which are carried via parallel data bus 50 to the trigger counter 34. The timing adjustment control 48 may be, for example, a thumb wheel device adapted for rotary adjustment by the operator and providing a digital output representative of the relative rotary position of the thumb wheel. If manual adjustment of the timing is not desired, the fixed digital number representing a fixed time delay may be hard wired to the trigger counter 34. The output of trigger generator 12 is coupled via lead 58 to the set or S terminal of the pretrigger flip flop 30, and via lead 60 to the set or S terminal of trigger flip flop 38. The output of trigger pickoff circuitry 17 is coupled via lead 62 to the reset or R terminal of the modulator delay flip flop 24.

Figure 2:
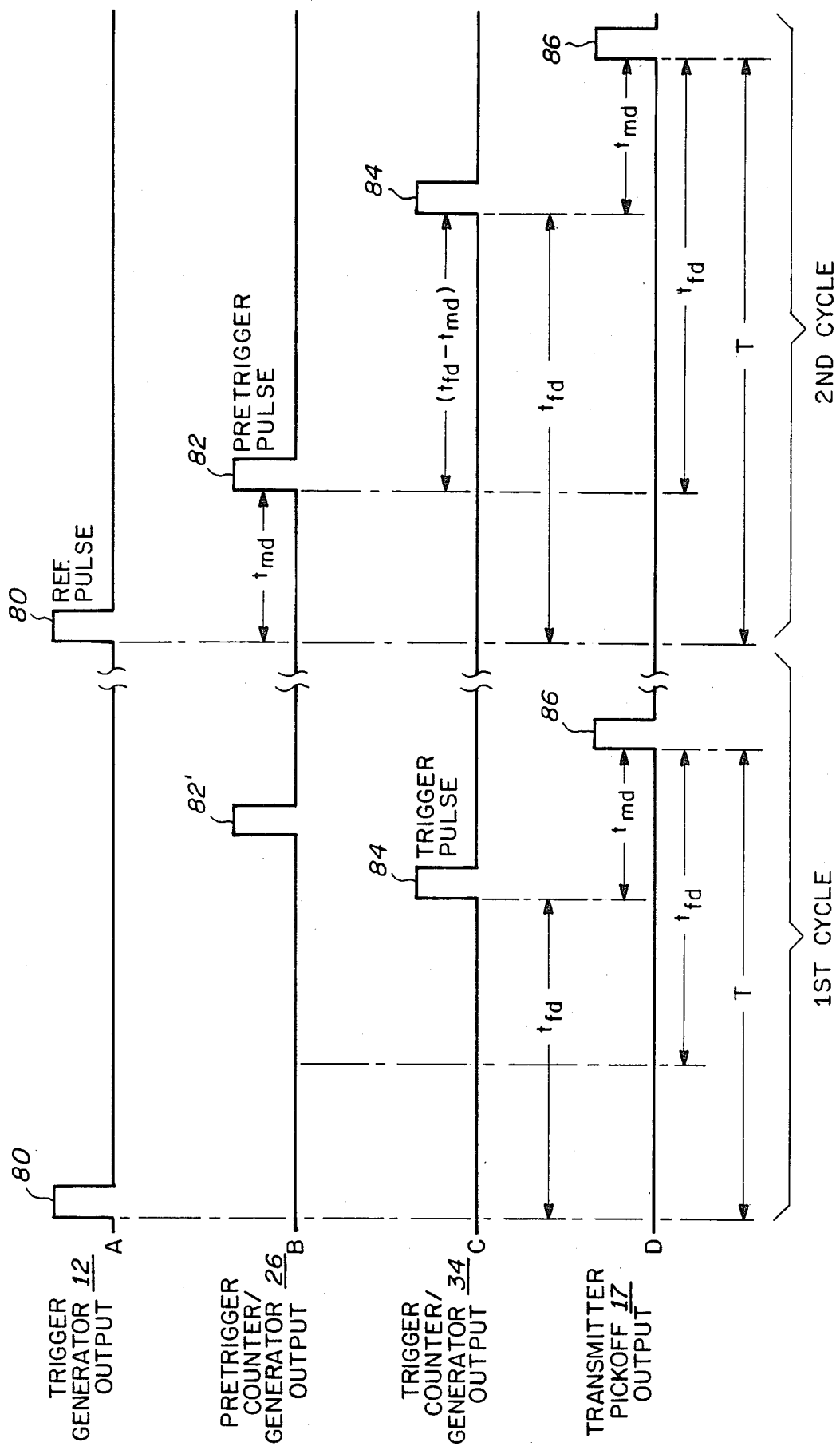
FIG. 2 is a waveform timing diagram illustrating the operation of the invention.

Referring to FIG. 2 with continued reference to FIG. 1, Line A of FIG. 2 depicts the output trigger generator 12 which comprises a reference pulse 80 occurring once during each cycle of circuit operation. Each cycle of operation may be considered as beginning with a first such reference pulse 80 and ending with the next succeeding reference pulse. Line B of FIG. 2 depicts the output of pretrigger counter 26 which comprises a pulse 82. Line C of FIG. 2 depicts the output of trigger counter 34 which comprises a pulse 84 during each cycle of circuit operation. Line D of FIG. 2 depicts the output signal of trigger pickoff circuitry 17 which comprises an output pulse 86 indicative that the radar has fired. In prior art radar systems, the output of trigger generator 12 would normally be applied to the radar modulator 10 which would in turn trigger the radar to fire after a finite time delay through the modulator circuitry. The present invention utilizes the output of trigger generator as a reference pulse and generates a pretrigger and trigger pulse after preselected time delays.

It will initially be assumed that the modulator delay counter 18, the pretrigger counter 26, and the trigger counter 34 have been reset or initialized at some value as will be discussed more fully below. It will further be assumed that the logical state of the respective enable leads 22, 32, and 40 are such that none of the counters are initially enabled. Further it will be assumed that the timing adjustment control 40 has been preset by the operator and contains a plurality of digits representative of a desired time delay between the generation of a pretrigger pulse and the firing of the radar transmitter. These digits are coupled to the trigger counter 34 through parallel data bus 50 and may be considered as an initial condition for the counting operation of trigger counter 34. Finally it will be assumed that the modulator delay counter 18 has been reset to some initial, preferably zero, value. As will be explained, the pretrigger counter 26 is initially set to a value received on data bus 42 from the modulator delay counter 18. This initial value is established during the immediately preceding operation cycle. Thus during the first cycle of operation after system turn on the numerical value on the data bus 42 may be treated as spurious and therefore disregarded. This may be accomplished in practice by including in the peripheral devices a logic circuit which ignores the first pretrigger pulse on lead 44 after system turn on. Other techniques for ignoring the initial pretrigger pulse will be apparent to those skilled in the art.

With the onset of trigger pulse 80 from trigger generator 12 the pretrigger flip flop 30 and the trigger flip flop 38 are set and the logical states of their respective enable leads 32 and 40 change. The pretrigger counter 26 and the trigger counter 34 then begin counting in synchronism with the system clock 16. Counting proceeds from the initial condition to which the pretrigger counter and trigger counter have been set via data bus 42 and data bus 50, respectively. When a preselected terminal condition is reached, the counting stops, and a pulse is emitted. For example, the counters might be configured to count backwards from the initial condition to zero, wherein zero would represent the terminal count value. Of course, the counting may be either forwards or backwards and the terminal count may be any number such that a time delay is generated between the occurrence of reference pulse 80 and the pretrigger and trigger pulses emitted from the respective counters when the respective terminal counts are reached. Those skilled in the art will recognize that if the pretrigger counter or trigger counter changes count with each clock pulse, the time delay so generated may be computed according to the following formula, wherein $t_d$ is the time delay, $f_c$ is the frequency of the clock, and $n_i$ and $n_t$ represent the initial and terminal numerical counts.

$$t_d = (n_i - n_t)/f_c$$

With reference to the left half of FIG. 2 which shows the operation of the invention during a first cycle of operation after system turn on, the trigger counter 34 counts in synchronism with the system clock 16 from the initial condition set via timing adjustment control 48 to the terminal count, preferably zero. When the terminal count is reached the trigger counter emits a pulse 84. The trigger counter pulse 84 is delayed a time $t_{fd}$ from the trigger generator output pulse or reference pulse 80, as shown on line C of FIG. 2. As discussed above, this time delay $t_{fd}$ depends on the numerical spread between the initial and final numerical counts and upon the clock frequency.

Similarly, the pretrigger counter 26 counts in synchronism with the system clock 16. However, during the first cycle of operation after system turn on the initial condition on pretrigger counter 26 is considered spurious. When the pretrigger counter reaches its terminal condition a pretrigger pulse is emitted. Since this first pretrigger pulse was based on a spurious initial condition, it is to be ignored by the peripheral equipment 14. This first pretrigger pulse is shown on line B of FIG. 2 and given the reference numeral 82', its position with respect to the reference pulse 80 is strictly arbitrary and is shown on line B for illustration purposes only.

The trigger counter pulse 84 is applied through lead 54 to the reset terminal of trigger counter flip flop 38, causing the flip flop state to change, thereby disabling and resetting trigger counter 34. The trigger counter pulse 84 is also applied through lead 46 to the radar modulator 10. The pulse 84 triggers the radar modulator 10 in the usual fashion causing the radar modulator to fire after some finite time delay. This firing event is sensed by the trigger pickoff circuitry 17 which provides an output pulse 86 which is depicted on line D in FIG. 2. Pulse 86 will be seen to be delayed a time $t_{md}$ from the trigger counter pulse 84. This time delay $t_{md}$ is the inherent time delay characteristic of the particular radar modulator, which is known to vary from transmitter to transmitter and with changes in temperature, humidity, prime power fluctuations, and the like. The trigger counter pulse 84 is also applied through lead 52 to the set or S terminal of modulator delay flip flop 24 causing the logical state on the enable lead 22 to change, thereby enabling the modulator delay counter 18. At this time the modulator delay counter 18 begins to count in synchronism with the system clock 16. When the radar modulator 10 fires, the pulse 86, indicative of this event, is coupled through lead 62 to the reset or R terminal of the modulator flip flop delay 24. When the reset terminal of flip flop 24 is activated, the modulator delay counter is disabled, holding the count obtained just prior to being disabled. This count is transferred on parallel data bus 42 to the pretrigger counter 26. It will be seen that the count is a measure of the time delay $t_{md}$ generated by the radar modulators circuitry, and is applied to the pretrigger counter 26 as an initial condition for the succeeding cycle of operation.

The second cycle of operation is shown on the right hand side of FIG. 2. During the second cycle the output pulse or reference pulse 80 of trigger generator 12 is applied to the pretrigger flip flop 30 and to the trigger flip flop 38, which enables the pretrigger counter 26 and trigger counter 34. Both counters 26 and 34 begin counting in synchronism with the system clock as discussed above.

When enabled, the pretrigger counter 26 begins to count starting with the initial condition which was set thereon via parallel data bus 42 during the first cycle of operation. When the pretrigger counter 26 reaches its terminal count it emits a pretrigger pulse 82 which is carried on lead 44 to the peripheral devices 14 and also carried on lead 45 to be reset for R terminal of flip flop 30. This resets the flip flop 30 which disables the pretrigger counter 26 from further counting. As shown in line B of FIG. 2, the pretrigger pulse 82 occurs a time $t_{md}$ after the reference pulse 80, this being identical to the radar modulator delay time which was measured by the modulator delay counter 18 during the previous cycle of operation.

Similarly, the trigger counter 34 begins to count starting with the initial condition set thereon by the timing adjustment control 48 via data bus 50. When the terminal condition is reached the trigger counter emits a pulse 84 which will be seen on line C of FIG. 2 to occur a time $t_{fd}$ after the reference pulse 80. It will be seen that the trigger pulse 84 occurs a time $t_{fd} - t_{md}$ after the pretrigger pulse 82. As discussed above the trigger pulse 84 simultaneously triggers the radar modulator 10, enables the modulator delay counter 18, and resets the trigger counter 34. The radar modulator again fires as illustrated by pulse 86 on line D of FIG. 2, which will be seen to be a time T after the reference pulse 80 which initiated that cycle. With reference to line B and C of FIG. 2, it will be seen that the trigger pulse 84 occurs a time $t_{fd} - t_{md}$ after the pretrigger pulse 82 and with reference to line D of FIG. 2 it will be seen that radar modulator fires, concurrent with pulse 86, a time $t_{fd}$ after the pretrigger pulse 82. Hence it will be seen that the operator can effectively control the timing of the pretrigger pulse 82 with respect to the firing of the radar modulator by adjusting the time $t_{fd}$ selected by the timing adjustment control 48.

Thus the circuit of the present invention provides a pretrigger pulse for use with peripheral equipment and also provides a radar trigger pulse. The circuit makes a dynamic measurement for each timing cycle of the inherent radar time delay $t_{md}$ which is used to insure against timing errors in the pretrigger which can arise on account of component aging or climate changes. The inherent radar time delay is measured and compensated for by the invention thus eliminating the need to adjust the pretrigger circuitry to each individual radar transmitter The circuit also permits the operator to vary or preselect the occurence of the pretrigger pulse in relation to the modulator being triggered. This may be done from a remote location, for instance.

While the invention has been described in its preferred embodiments, it is to be understood that the words that have been used are words of description rather than of limitation and that changes within the purview of the appended claims may be made without departing from the true scope and spirit of the invention in its broader aspects.

We claim:

1. An apparatus for providing a trigger pulse to a circuit and a pretrigger pulse with a preselected time delay between the pretrigger pulse and the responsive signal output from the circuit comprising:

means for providing reference pulses, means coupled to trigger input means of said circuit and responsive to said reference pulses for generating said trigger pulses after a preselected time delay from said reference pulses, means coupled to said trigger input means to receive said trigger pulses and to output means of said circuit to receive output signals therefrom for measuring time delays between said trigger pulses and said output signals and for providing signals representative of said measured time delays, and means coupled to receive said time delay representative signals and said reference pulses for providing pretrigger pulses at a time after receipt of said reference pulses that is equal to said measured time delay.

2. An apparatus according to claim 1 wherein said time delay measuring means comprises:

delay counter means coupled to receive clock pulses, for producing clock counts representative of said time delays between said trigger pulses and said output signals; and first bistable means coupled to said delay counter means, to said trigger pulse means for enabling said delay counter means in response to trigger pulses, and to said output means for disabling said delay counter means in response to said output signals.

3. The apparatus according to claim 2 wherein said time delay measuring means further includes second bistable means responsive to said reference pulse for enabling said pretrigger pulse means and responsive to said pretrigger pulse for disabling said pretrigger pulse means.

4. The apparatus according to claim 1 wherein said trigger pulse generator means includes means coupled to receive said reference pulses and clock pulses for providing trigger pulses at said preselected times after said reference pules.

5. The apparatus according to claim 4 wherein said trigger pulse generator means further includes a counter having output means coupled to said circuit and a third bistable means coupled to said counter, said third bistable means responsive to said reference pules for enabling said counter and responsive to said trigger pulses for disabling said counter.

6. The apparatus according to claim 5 wherein said trigger pulse generator means further comprises means coupled to said counter for establishing a count representative of said preselected time delay.

7. Apparatus for triggering a modulator of a RF transmitter to emit transmitter trigger pulses and for providing pretrigger pulses at preselected times therebefore comprising:

means for providing reference pulses, means coupled to trigger input means of said modulator and responsive to said reference pules for providing trigger pulses to said modulator after a preselected time delay from said reference pulses, means coupled to said trigger input means to receive said trigger pulses and to output means of said modulator to receive said transmitter trigger pulses for measuring time delays between said trigger pulses and said transmitter trigger pulses and for providing signals representative thereof, and means responsive to said time delay representative signals and said reference pulses for generating pretrigger pulses at a time after receipt of said reference pulses that is equal to said measured time delay.

8. An apparatus according to claim 7 wherein said time delay measuring mean comprises:

delay counter means coupled to receive clock pulses, for producing clock counts representative of said time delays between said trigger pulses and transmitter trigger pulses; and first bistable means coupled to said delay counter means, to said trigger pulse means for enabling said delay counter means in response to trigger pulses and to said output means of said modulator for disabling said delay counter means in response to said transmitter trigger pulses.

9. The apparatus according to claim 8 wherein said time delay measuring means further includes second bistable means responsive to said reference pulse for enabling said pretrigger pulse means and responsive to said pretrigger pulse for disabling said pretrigger pulse means.

10. The apparatus according to claim 7 wherein said trigger pulse generator means includes means coupled to receive said reference pulses and clock pulses for providing trigger pulses at said preselected times after said reference pulses.

11. The apparatus according to claim 10 wherein said trigger pulse generator means further includes a counter having output means coupled to said modulator and a third bistable means coupled to said counter, said third bistable means responsive to said reference pulses for enabling said counter and responsive to said trigger pulses for disabling said counter.

12. The apparatus according to claim 11 wherein said trigger pulse generator means further comprises means coupled to said counter for establishing a count representative of said preselected time delay.

* * * * *